(12) United States Patent
Arana et al.

(10) Patent No.: US 11,172,093 B2
(45) Date of Patent: Nov. 9, 2021

(54) SYSTEM AND METHOD FOR CREATING A TEMPORAL-BASED DYNAMIC WATERMARK

(71) Applicant: Disney Enterprises, Inc., Burbank, CA (US)

(72) Inventors: Mark Arana, Agoura Hills, CA (US); Leon Silverman, Encino, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1103 days.

(21) Appl. No.: 14/960,702

(22) Filed: Dec. 7, 2015

(65) Prior Publication Data

US 2017/0163839 A1   Jun. 8, 2017

(51) Int. Cl.
*H04N 1/32*       (2006.01)
*H04N 21/414*     (2011.01)
*H04N 21/8358*    (2011.01)
*H04N 21/262*     (2011.01)
*H04N 21/458*     (2011.01)
*G06T 1/00*       (2006.01)
*H04N 21/422*     (2011.01)

(52) U.S. Cl.
CPC ......... *H04N 1/3232* (2013.01); *G06T 1/0021* (2013.01); *H04N 1/32309* (2013.01); *H04N 21/26291* (2013.01); *H04N 21/41415* (2013.01); *H04N 21/42202* (2013.01); *H04N 21/4586* (2013.01); *H04N 21/8358* (2013.01)

(58) Field of Classification Search
CPC ... G06T 1/0021; G06T 1/005; H04N 1/32309; H04N 21/26291; H04N 21/41415; H04N 21/42202; H04N 21/4586; H04N 21/8358; H04N 5/23203; H04N 5/23245; H04N 5/23293; H04N 5/44; G06F 3/0416

USPC .................................................. 386/260, 232
See application file for complete search history.

(56) References Cited

U.S. PATENT DOCUMENTS 6,961,444 B2   11/2005   Levy
7,779,058 B2    8/2010   Shea
7,822,225 B2   10/2010   Alattar
8,103,879 B2    1/2012   Levy et al.
(Continued)

FOREIGN PATENT DOCUMENTS

CN         1883201 A       12/2006
CN       101636739 A        1/2010
(Continued)

OTHER PUBLICATIONS

European Patent Office, European Search Report for European Application No. EP 16197483.7, May 2, 2017, pp. 1-8.
Chen et al., Robust Track-and-Trace Video Watermarking, accessed at Oct. 12, 2015 at http://www.wu.ece.ufl.edu/mypapers/RobustWatermarking_v4.3.pdf.
(Continued)

*Primary Examiner* — Christopher Braniff
(74) *Attorney, Agent, or Firm* — Farjami & Farjami LLP

(57) ABSTRACT

Systems and methods for dynamically and automatically generating digital watermarks are provided. Watermark payloads utilized in generating the digital watermarks are altered based upon changing conditions, such as environmental characteristics associated with playback or distribution of media content. Changing conditions may also encompass a change in the distribution/presentation chain of devices associated with the playback or distribution of the media content.

20 Claims, 6 Drawing Sheets

(56) References Cited

U.S. PATENT DOCUMENTS

| | | | |
|---|---|---|---|
| 8,380,879 B2* | 2/2013 | Tischer | H04M 1/677 |
| | | | 370/401 |
| 8,385,590 B1 | 2/2013 | Moorer | |
| 8,452,971 B2 | 5/2013 | Kalker et al. | |
| 8,522,032 B2 | 8/2013 | Strein | |
| 8,990,844 B2 | 3/2015 | Oh et al. | |
| 9,058,645 B1 | 6/2015 | Corley et al. | |
| 9,123,106 B2 | 9/2015 | Homme et al. | |
| 9,225,761 B2* | 12/2015 | Ficco | G06Q 30/02 |
| 2005/0129269 A1* | 6/2005 | Lin | H04L 9/3236 |
| | | | 382/100 |
| 2006/0280246 A1 | 12/2006 | Alattar et al. | |
| 2009/0031134 A1 | 1/2009 | Levy | |
| 2014/0092299 A1* | 4/2014 | Phillips | H04N 5/2252 |
| | | | 348/376 |
| 2014/0325550 A1 | 10/2014 | Winograd et al. | |
| 2014/0366159 A1 | 12/2014 | Cohen | |
| 2015/0003608 A1 | 1/2015 | Ansari et al. | |
| 2015/0078551 A1 | 3/2015 | Kitahara et al. | |
| 2015/0281774 A1 | 10/2015 | Atkin | |

FOREIGN PATENT DOCUMENTS

| | | | |
|---|---|---|---|
| CN | 104205107 A | 12/2014 |
| EP | 2028617 A2 | 6/2002 |
| EP | 2028617 A2 | 2/2009 |
| EP | 2843963 A1 | 3/2015 |
| GB | 2505657 A1 | 3/2014 |
| WO | 200171960 A1 | 9/2001 |
| WO | 2008114162 A1 | 9/2008 |

OTHER PUBLICATIONS

Milano, Content Control: Digital Watermarking and Fingerprinting, accessed on Oct. 12, 2015 at https://www.digimarc.com/docs/default-source/technology-resources/white-papers/rhozet_wp_fingerprinting_watermarking.pdf?sfvrsn=4.

2nd Office Action in Chinese Patent Application No. 2016111066800, dated Oct. 5, 2019.

1st Office Action in European Patent Application No. 16197483.7, dated Nov. 20, 2019.

First Office Action in Chinese Patent Application No. 2016111066800, dated Apr. 3, 2019.

* cited by examiner

SYSTEM AND METHOD FOR CREATING A TEMPORAL-BASED DYNAMIC WATERMARK

TECHNICAL FIELD

The present disclosure relates generally to watermarking content before or during playback.

DESCRIPTION OF THE RELATED ART

Digital watermarking is a technique for embedding data in media content, such as audio-visual content, for example. A digital watermark may go unnoticed by an ordinary consumer of the media content, but carries information that may be used for a variety of purposes. For example, a digital watermark embedded in a digital movie file may be used to identify the producer or distributor of the media content, or may identify the point of origin of the digital movie file carrying the media content. A digital watermark may be visible or invisible to the viewer of the content.

BRIEF SUMMARY OF THE DISCLOSURE

Various embodiments are directed to dynamically generating watermarks during a viewing of an audio-visual work capable of indicating a change in the presentation environment of media content. For example, watermark payloads utilized in generating a dynamic watermark can be configured to reflect one or more changes in the number of viewers watching a movie in a theater. Other embodiments are directed to dynamically generating watermarks capable of indicating a change in the chain of devices used in the distribution and/or playback of media content. For example, the aforementioned watermark payloads can be configured to reflect when the media content goes from being presented on a TV set to a tablet PC.

In accordance with one embodiment, a computer-implemented method comprises generating a watermark payload based upon a chain of one or more devices through which content is distributed. The computer-implemented method further comprises detecting a change in the chain of the one or more devices, and altering the watermark payload based upon the detected change in the chain of the one or more devices.

In accordance with another embodiment, an apparatus comprises a processor, and a memory unit operatively connection to the processor. The memory unit, which includes computer code, is configured to cause the processor: generate a first digital watermark; embed the first digital watermark in a digital media content file; detect a change in conditions associated with the distribution of the digital media content file; generate a second digital watermark reflecting the change in the conditions; and embed the second digital watermark in the digital media content file.

In accordance with another embodiment, a computer-implemented method comprises generating a watermark payload based upon one or more environmental characteristics present during content distribution; detecting a change in the one or more environmental characteristics; and altering the watermark payload based upon the detected change in the one or environmental characteristics.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

The use of digital technology to distribute and/or present media content has become popular due to advances in computer networking, communication technologies, and digital storage media, such as hard drives, Blu-ray Discs™, and optical disks. For example, digital cinema can refer to the use of digital projectors for projecting digital movie files received on the aforementioned digital storage media or via the Internet or dedicated communication links between a theater and a content provider.

As noted above, a digital watermark may be embedded in a digital movie file and subsequently detected to identify the producer or distributor of the media content, and/or the point of origin of the digital movie file carrying the media content. However, conventional systems and methods of watermarking are "static" in that the point of origin or source of the digital movie file may only consider an initial distribution chain of devices in generating a digital watermark. Thus, any subsequent change in the distribution chain goes undetected, as well as any circumvention of DRM restrictions or protection that may occur with such a change. Additionally, changes in the environment, such as the number of viewers present during media content playback, or a change in location where the media content is presented may also suggest DRM circumvention. Accordingly, various embodiments disclosed herein are directed to dynamically generating digital watermarks to account for such changes in the distribution chain and/or environment.

Figure 1A:
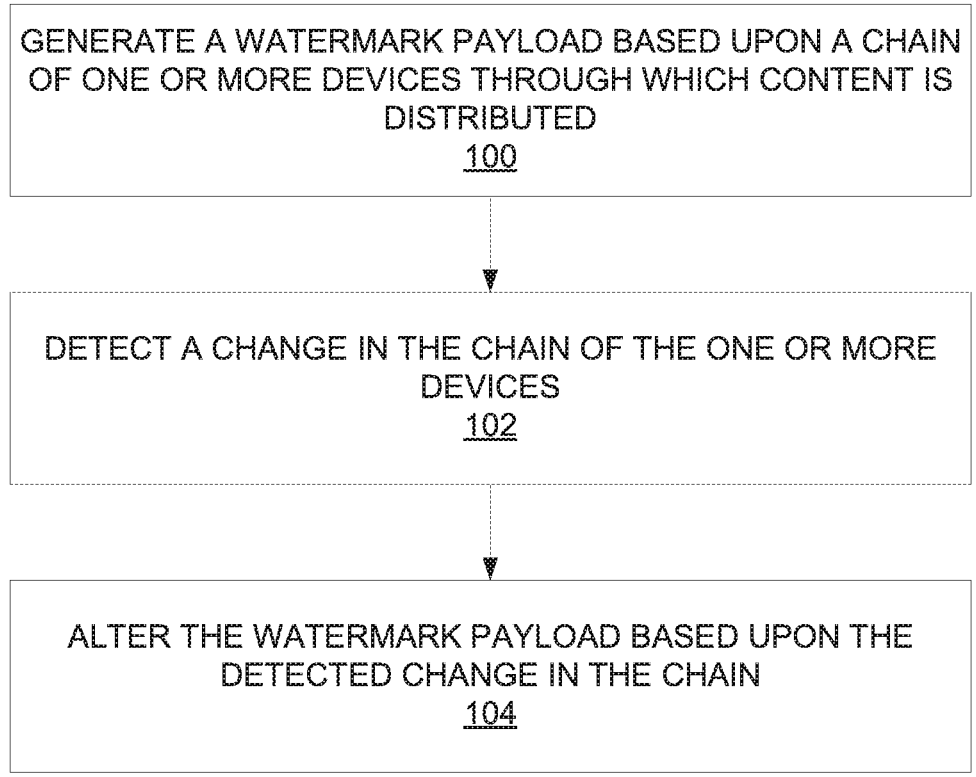
FIG. 1A is a flow chart illustrating example operations that can be performed to generate dynamic watermarks in accordance with one embodiment.
Figure 2A:
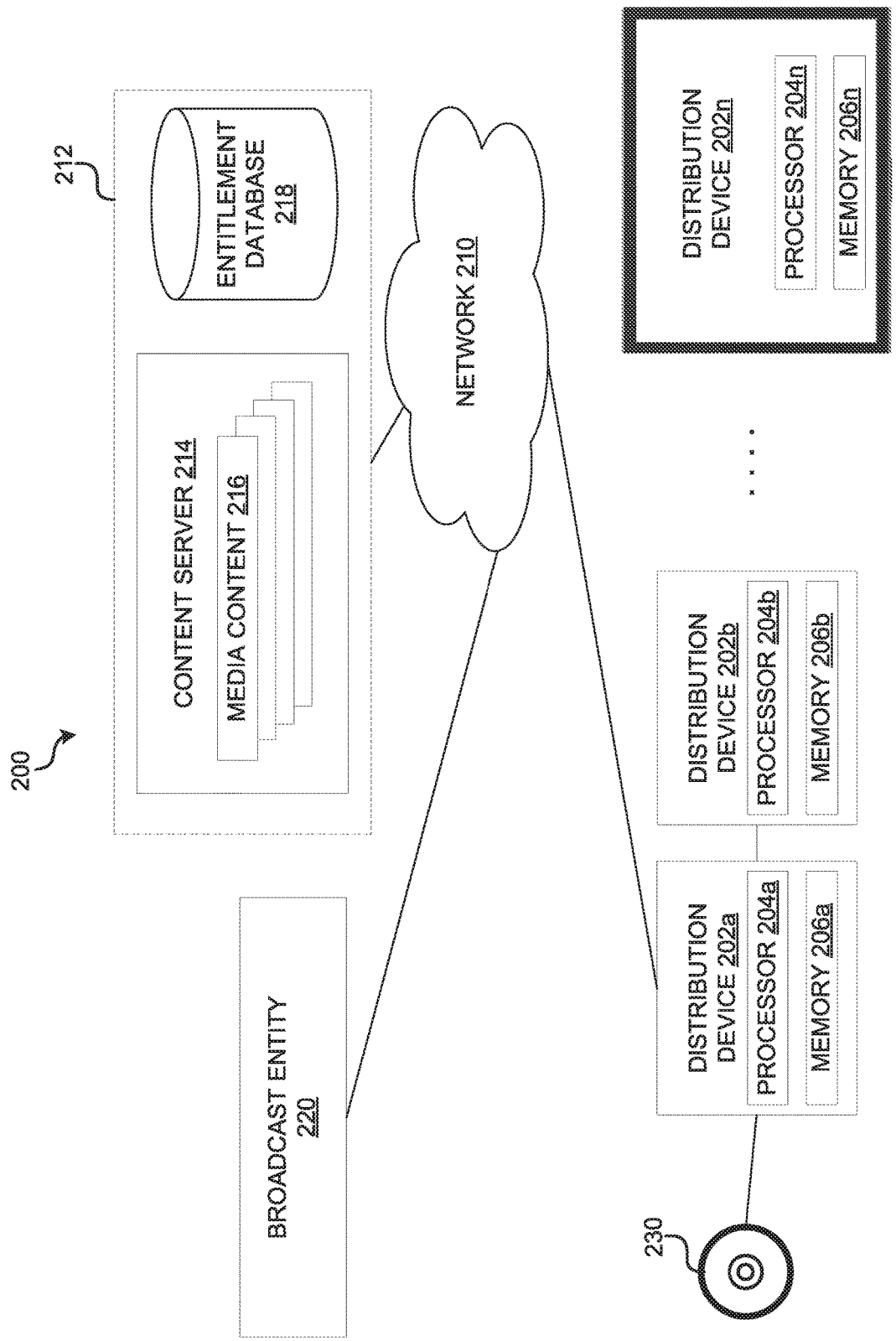
FIG. 2A illustrates an example environment in which various embodiments may be implemented.
Figure 2B:
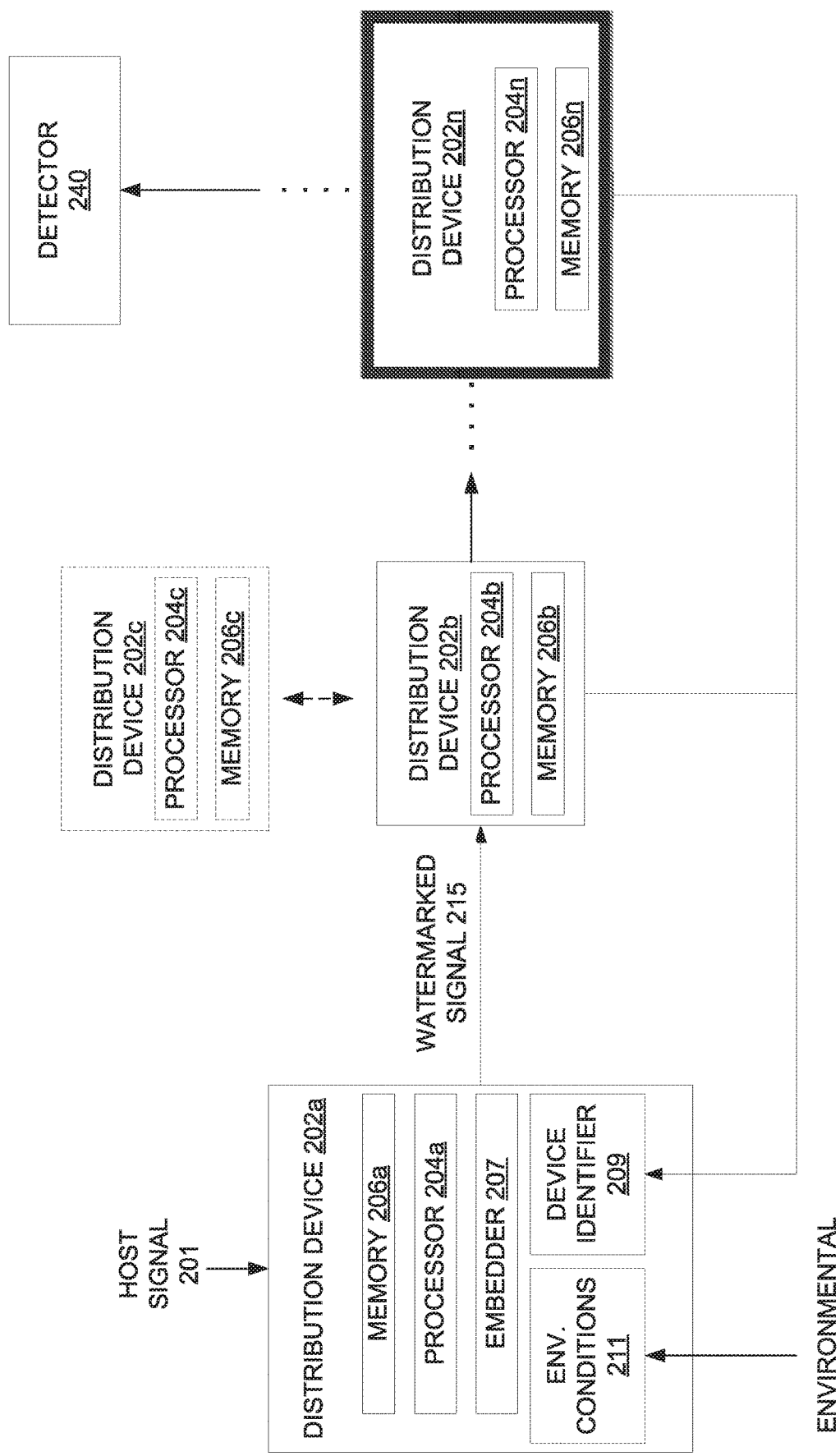
FIG. 2B illustrates a schematic representation of dynamic watermarking in the example environment of FIG. 2A.

FIG. 1A illustrates example operations performed in accordance with various embodiments for generating watermarks to be embedded in media content, such as a digital movie file, where the watermarks can dynamically change to reflect changes in the distribution/presentation chain of devices. Reference will be made to FIGS. 2A and 2B to reflect the implementation of those operations in an example system 200.

It should be noted that media content in the present disclosure can be any type of content, including but not limited to movies, broadcast TV shows, online videos, user-created videos/content, music, images, sports games, video games, and the like. Media content can also be a recording of any type of event or occurrence, the presentation of which is recorded for presentation in real-time or for later consumption. Moreover, the media content can be accessed or originate from one or more broadcast entities, media content servers, personal devices, etc. Protected content may be content having DRM access control restrictions, such as specially coded content files, content identified as being non-reproducible without the content-owner's consent, and the like.

At operation 100, a watermark payload is generated based upon a chain of one or more devices through which content is distributed and/or presented. Different methods of digital watermarking may be utilized in accordance with various embodiments. The watermark payload is an example of one or more digital data elements or metadata that can be embedded in the media content, and in particular, is the number of bits that a watermark encodes within a time unit (in the video context, the number of embedded bits per frame or series of frames). The watermark payload may reflect, for example, a change to some aspect(s) of certain pixels in the media content. Changing pixels can include, but is not limited to moving the location of pixels, altering the color and/or hue of pixels, and applying a mathematical transform to pixel data.

In accordance with a first type of digital watermarking referred to as forensic watermarking, software can be applied to a digital movie file that changes the content, such as pixels, of one or more frames. The watermark payload can be embedded in the digital movie file in one frame or over the course of several frames, seconds, or minutes of the digital movie file. This results in a watermark that is visually imperceptible or nearly imperceptible to viewers, but can be detected (using a detector) in illegitimately reproduced copies of the digital movie file and extracted. The watermark can indicate the source of the digital movie file and/or a distribution chain associated with distributing/presenting the digital movie file (discussed in greater detail below with respect to FIGS. 2A and 2B).

Still another form of digital watermarking, referred to as session-based watermarking, may involve digitally watermarking a digital movie file in the same or similar manner as discussed above. In this type of digital watermarking, a user or purchaser of the digital movie file can be identified (as well as a time and/or date that the user recorded, ripped, or otherwise attempted to copy the digital movie file) via the session-based digital watermark.

FIG. 2A illustrates an example system 200 in which dynamic watermarking in accordance with various embodiments may be implemented. System 200 can include one or more distribution devices 202a-202n, each of which may have respective processors 204a-204n and memory units 206a-206n. Distribution devices 202a-202n can be configured to receive and/or store media for distribution and/or presentation. Distribution devices 202a-202n may be a DVR, a cable/satellite/internet protocol television (IPTV) set-top box, a gaming console, a tablet personal computer (PC), a smart phone, a laptop PC, etc. For example, distribution device 202a may be gaming console, distribution device 202b may be an audio receiver, and distribution device 202n may be a TV, monitor, or other presentation/media content consumption apparatus.

System 200 may further include a content provider 212, which may be a television broadcast network entity (e.g., ABC), a cable provider (e.g., COMCAST®), or any other digital media content distributor, such as Amazon®, iTunes®, Netflix® or other third-party distributor. Content provider 212 may include a content server 214 on which digital media content 216 can be stored, along with any required entitlements which can be maintained in entitlement database 218. It should be noted that in certain scenarios where content provider 212 is, e.g., a digital media content distributor, such as Amazon®, iTunes®, etc., distribution device 202a may receive media content from a separate broadcast entity 220, such as a cable provider. In accordance with another embodiment, content provider 212 may be a content creator, e.g., production studio, that also distributes its own content to consumers. In accordance with yet another embodiment, distribution device 202a can receive media content on a digital storage medium 230.

DRM protections or restrictions may be applied to media content 216. Accordingly, one or more licenses or temporary licenses can be created, utilized, and/or transferred to the appropriate entities in accordance with various embodiments. Such licenses can be configured to account for varying levels of access and/or distribution, time limits, usage limits, as well as partitioned if need be. For example, broadcast entity 220 may obtain a temporary license to some media content 216 from content provider 212. In this way, a viewer is allowed to request and receive that media content for viewing via an interface (e.g., video on demand) of broadcast entity 220. As another example, a viewer may purchase a license directly from content provider 212 in order to view media content 216.

Network 210 may be any communications network such as a cellular or data network, a satellite network, an intranet, an extranet, a virtual private network (VPN), a local area network (LAN), a wireless LAN (WLAN), a wide area network (WAN), a personal area network (PAN), a portion of the Internet, a portion of the Public Switched Telephone Network (PSTN), or any combination thereof. Accordingly, network 210 may employ various communication media, such as a coaxial cable, fiber optic cable system, Ethernet, radio waves, etc.

FIG. 2B illustrates a focused view of system 200 concentrating on the digital watermarking aspects of the various embodiments disclosed herein. Accordingly, distribution device 202a is illustrated in greater detail to include an embedder 207, a device identifier 209, and an environmental conditions unit 211 (to be discussed in greater detail with respect to FIG. 1B). It should be noted that in this context, distribution device 202a may be considered to be a source device relative to other devices in the distribution chain.

In operation, a digital signal 201, such as an audio, an image, or a video signal representative of the digital movie file, may be used as a carrier (host) for a digital watermark, imperceptibly or nearly imperceptibly embedded into it by a process employed by embedder 207. The watermarked host signal 215 (i.e., digitally watermarked media content) is then delivered via a communication channel(s) connecting distribution device 202a to distribution devices 202b-202n. This communication channel(s) may comprise one or more wired or wireless connections. It should be noted that when the watermarked host signal 215 is received by a detector 240, the received watermarked host signal is a distorted version of the watermarked host signal 215, as the communication channel 250 may represent further processing of the watermarked host signal 215 (namely compression, scaling, filtering, cropping, or additive channel noise that are introduced during circumvention of DRM protections).

A digital watermark may be embedded into the host signal 201 in the spatial domain, the transform domain, or a combination thereof. First, the digital watermark can be converted into a bitstream, and insertion of the bitstream can be done by substitution. For example, when using the host signal spatial domain, the least significant bit of a pixel value may be replaced by a watermark bit ("1" or "0"). To ensure that the watermarked host signal 215 is perceptually identical to the (original) host signal 201, the components in the spatial domain that are modified by the bitstream may be those that are perceptually least significant. When embedding the bitstream in the transform domain, transforms such as Discrete Fourier Transform (DFT), Discrete Cosine Transform (DCT), Discrete Wavelet Transform (DWT), Counterlet Transform (CT), or Singular Value Decomposition (SVD) can be used. Thus, one or more transform coefficients may be used to embed the watermark bits. In the transform domain, most of the image energy is distributed across the low-medium frequency coefficients. Therefore, modifications made by substituting the watermark bits into these coefficients are distributed across an entire image and, therefore, changes to the watermarked image due to further processing (e.g., compression) will change the watermarked coefficient only slightly.

Additive watermarking is another approach for embedding a watermark bitstream into the host signal 201. For example, when using the host signal spatial domain to embed a watermark bit into a pixel in an image, a certain value may be added if the bit is "1", otherwise, no addition is performed. The larger the added value is, the more robust the watermarking method and the less imperceptible it is. To improve imperceptibility, the added value can be divided among a group of pixels (e.g. an 8×8 block). In the transform domain, multiplicative watermarking may be used where the significant coefficients are multiplied by a certain value if an embedded watermark bit is "1".

Some content can be formatted in a manner that allows for alternative methods of forensic marking. One such alternative can utilize variants to deliver a payload when the content is formatted in accordance with International Organization for Standardization (ISO)/International Electrotechnical Commission (IEC) 14496-12 ISO Base Media File Format and using the ISO/IEC 23001-7 Common Encryption Scheme (CENC). In particular, content or media data can be used to construct a sample variant, where the sample variant can provide forensic information in rendered sample data identifying a DRM client. As with embedded watermark payloads, such variants can be altered/revised in accordance with changes in the environment and/or distribution chain (as will be discussed below).

Unlike conventional systems and method of watermarking, however, digital watermarking (or variant-based forensic marking) as contemplated in the present disclosure is dynamic. Referring back to FIG. 1A, a change in the chain of the one or more devices is detected at operation 102. That is, in initially generating a digital watermark, as described above, device identifier 209 obtains one or more relevant device identifiers from each of distribution devices 202a-202n. Such device identifiers may include a brand, model, serial number, software version, etc., or some combination thereof. Identifying each device in the distribution or presentation chain allows a detector to determine where in the chain a circumvention of DRM protections may have occurred.

Additionally, and if one or more devices in the chain changes, e.g., is substituted for another device, device identifier 209 is aware of this change and the initially generated digital watermark can be dynamically altered or adjusted to reflect this change. That is, the watermark payload is altered based upon the detected change in the chain at operation 104. For example, should distribution device 202b be replaced with distribution device 202c, device identifier 209 is aware of this substitution, and a new digital watermark can be generated and embedded via embedder 207. Distribution device identifiers can be obtained by device identifier 209 via one or applications running on the first or "source" distribution device (distribution device 202a in FIGS. 2A and 2B). Alternatively, device identifier 209 may obtain distribution device identifiers via a High Definition Multimedia Interface (HDMI) identifier referred to as Extended Display Identification Data (EDID) which can receive reports from each distribution device operative in an HDMI chain which include respective distribution device identifiers. It should be noted that still other methods of obtaining distribution device identifiers are contemplated herein, such as spoofing the EDID so that security certificate identifiers may be transmitted/received. This subsequent watermark, once detected, can then reflect a distribution chain including distribution devices 202a, 202c, and 202n, whereas the initial watermark reflected a distribution chain including distribution devices 202a, 202b, and 202n. Accordingly, an attempt to circumvent DRM protections using distribution device 202c (for example, if distribution device 202c is receiver known to have an available DRM hack), can be detected.

Regarding the watermark payload, conventional watermark payloads may be delivered over time, where the payload message is repeated throughout playback of the media content. In contrast, and as noted above, various embodiments alter the watermark payload during playback/distribution to reflect changing conditions, such as the distribution chain of distribution devices. In accordance with one embodiment, the watermark payload may be a bitmask 10110010 as represented in Tables 1 and 2, where positions are indicative of distribution devices or an operative aspect thereof in a distribution chain. In accordance with another embodiment, the watermark payload can be a string of alphanumeric characters, for example, that refers to a database entry containing the relevant forensic information, which in this example can be distribution device identification information.

TABLE 1

| | |
|---|---|
| Position A: | 1 |
| Position B: | 0 |
| Position C: | 1 |
| Position D: | 1 |
| Position E: | 0 |
| Position F: | 0 |
| Position G: | 1 |
| Position H: | 0 |

TABLE 2

| | |
|---|---|
| Position A: | HDCP 1 protection |
| Position B: | HDCP 2 protection |
| Position C: | Screenscraper active |
| Position D: | Blu-Ray 1.0 player |
| Position E: | Blu-Ray 2.0 player |
| Position F: | Software player |
| Position G: | Hardware player |
| Position H: | Reserved |

Figure 2C:
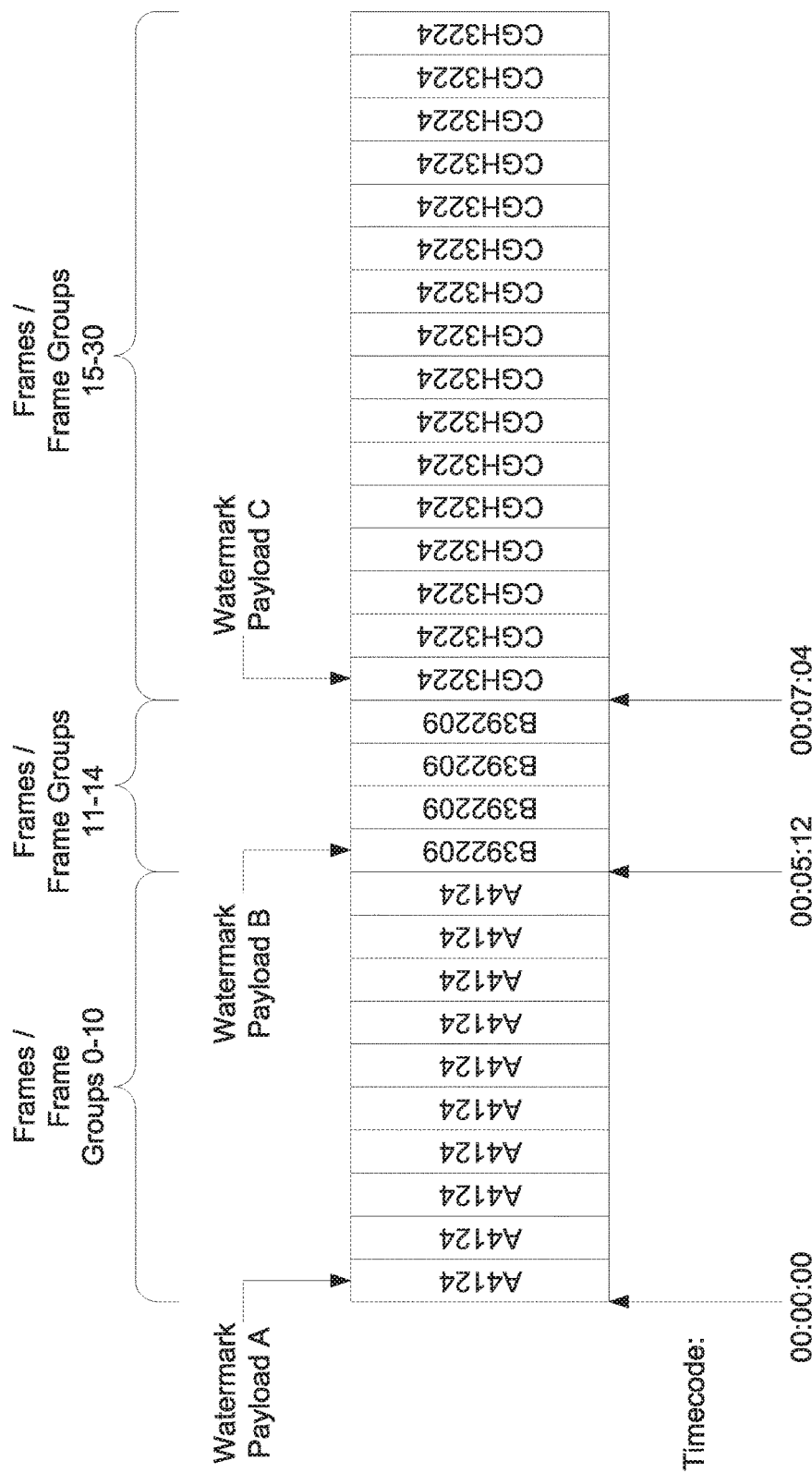
FIG. 2C is a graphical representation of altering watermark payload in accordance with various embodiments of the present disclosure.

FIG. 2C illustrates an example of altering watermark payload in accordance with various embodiments of the present disclosure. FIG. 2C illustrates 30 frames or frame groups, each represented by a box. Frames or frame groups 0-10 are embedded with a first watermark payload A, represented by alphanumeric characters "A4124." From time 00:00:00 to time 00:05:12, the distribution chain of display devices associated with distribution and/or presentation of the content remains constant. Accordingly, watermark payload A is embedded in frames or frame groups 0-10. At time 00:05:12, however, one or more distribution devices change. To capture this change, watermark payload A is altered, and a new/updated watermark B, represented by alphanumeric characters "B392209" is embedded thereafter in frames or frame groups 11-14. At time 00:07:04, another change to the distribution chain of distribution devices occurs, at which time, another new/updated watermark C, represented by alphanumeric characters "CGH3224" is embedded thereafter in frames or frame groups 15-30.

Figure 1B:
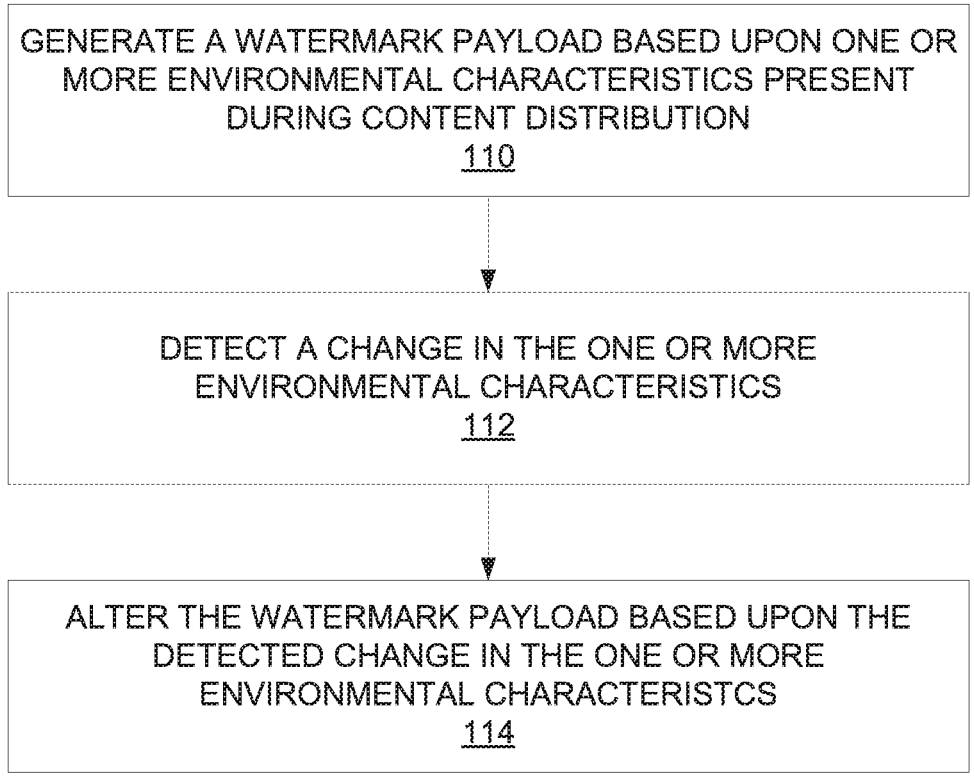
FIG. 1B is a flow chart illustrating example operations that can be performed to generate dynamic watermarks in accordance with another embodiment.

As alluded to previously, some embodiments can dynamically generate a digital watermark based upon changes in environmental characteristics. FIG. 1B illustrates example operations that may be performed to dynamically generate digital watermarks in response to the environment. At operation 110, a watermark payload is generated based upon one or more environmental characteristics present during content distribution.

For example, referring to FIG. 2A, system 200 may be an example of a digital cinema system, where a digital movie file referred to as a Digital Cinema Package (DCP) is received on a hard drive (an example embodiment of digital storage medium 230) or via satellite or fiber optic communication network (example embodiments of network 210). Distribution device 202a may be a cinema server onto which the digital movie file is downloaded and decrypted. Distribution device 202b may be a screen/projection management system for controlling media content playlists, lighting, sound, and/or distribution device 202n, which may be a digital projector through which the digital movie file is presented.

Referring to FIG. 2B, an environmental characteristics unit 211 may include one or more processors as well as memory on which one or more algorithms are stored and executed for analyzing data received from one or more environmental inputs 213. Environmental inputs 213 can include, but are not limited to one or more still or video cameras, one more sensors, a temperature monitor, a positioning unit or receiver, etc. that relays raw data indicative of environmental conditions. For example, the still or video cameras can be used to detect the number of viewers present in a theater, or alternatively, environmental characteristics unit 211 may receive pressure or temperature sensor data indicative of patrons sitting in theater seats. Yet another example can involve detecting the number of mobile devices, such as smart phones, present in the theater to estimate the number of viewers present. In accordance with this particular example, besides detecting circumvention of DRM protections, various embodiments can be used to detect other forms of circumvention/perform validation, such as validating ticket sales. Accordingly, and referring back to FIG. 1B, a change in the one or more environmental characteristics (such as a change in the number of people in the theater) is detected at operation 112. At operation 114, the watermark payload is altered based upon the detected change in the one or more environmental characteristics. Altering the watermark payload can be accomplished in the same or similar manner as described above.

It should be noted that any parameter(s) or characteristics can be monitored and documented/recorded in a watermark payload, where a user or security administrator or the like can configure the dynamically generated watermark disclosed herein as desired. Additionally, it should be noted that any detected change in environmental characteristics or a distribution chain can be documented/recorded in a temporal fashion, i.e., along with a date/time at which the change occurred. Moreover, the generation of dynamic watermarks based upon changing environmental conditions or distribution chain need not be exclusive of each other. That is, both environmental conditions and distribution chain can be monitored simultaneously and used as a basis for the generation of dynamic watermarks. Further still, changes in environmental conditions and/or distribution chain as described above can be detected by comparing a current state to an initial or original state and/or to a previous state.

It should be noted that although various embodiments presented herein have been described in the context of video/visual-based media content, other embodiments can be adapted for use in other contexts, such as audio, for example, radio content, podcasts, games, audio books, and other such content. Moreover, although embodiments have been described in the context imperceptible or nearly imperceptible watermarks, other embodiments may dynamically generate visible overlays.

Figure 3:
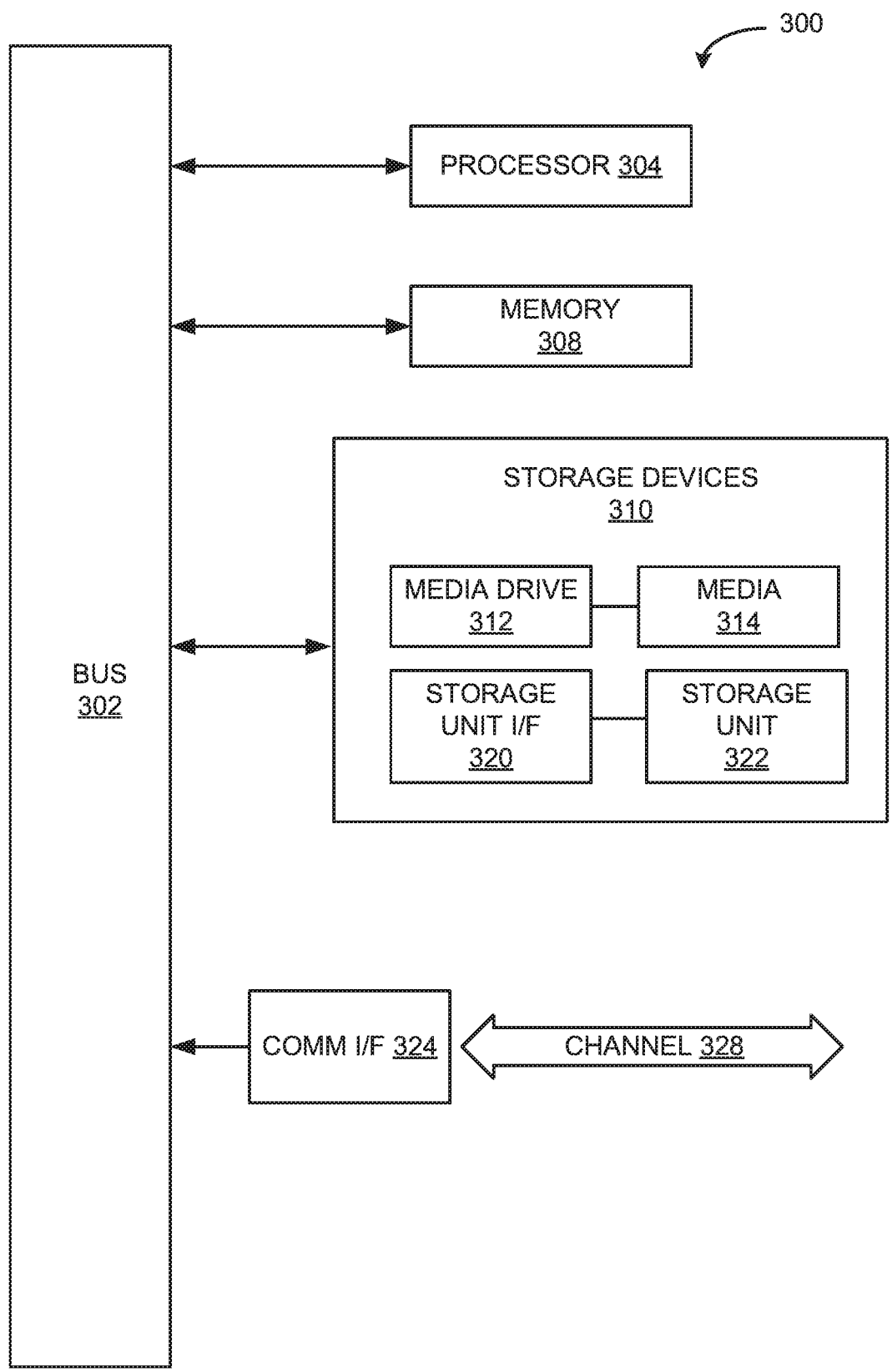
FIG. 3 is an example computing component that may be used to implement various features of embodiments described in the present disclosure.

FIG. 3 illustrates an example computing component that may be used to implement various features of the system and methods disclosed herein, such as the aforementioned features and functionality of one or more features of distribution device 202a.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components or components of the application are implemented in whole or in part using software, in one embodiment, these software elements can be implemented to operate with a computing or processing component capable of carrying out the functionality described with respect thereto. One such example computing component is shown in FIG. 3. Various embodiments are described in terms of this example-computing component 300. After reading this description, it will become apparent to a person skilled in the relevant art how to implement the application using other computing components or architectures.

Referring now to FIG. 3, computing component 300 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing component 300 might also represent computing capabilities embedded within or otherwise available to a given device. For example, a computing component might be found in other electronic devices such as, for example navigation systems, portable computing devices, and other electronic devices that might include some form of processing capability.

Computing component 300 might include, for example, one or more processors, controllers, control components, or other processing devices, such as a processor 304. Processor 304 might be implemented using a general-purpose or special-purpose processing engine such as, for example, a microprocessor, controller, or other control logic. In the illustrated example, processor 304 is connected to a bus 302, although any communication medium can be used to facilitate interaction with other components of computing component 300 or to communicate externally.

Computing component 300 might also include one or more memory components, simply referred to herein as main memory 308. For example, preferably random access memory (RAM) or other dynamic memory, might be used for storing information and instructions to be executed by processor 304. Main memory 308 might also be used for storing temporary variables or other intermediate information during execution of instructions to be executed by processor 304. Computing component 300 might likewise include a read only memory ("ROM") or other static storage device coupled to bus 302 for storing static information and instructions for processor 304.

The computing component 300 might also include one or more various forms of information storage mechanism 310, which might include, for example, a media drive 312 and a storage unit interface 320. The media drive 312 might include a drive or other mechanism to support fixed or removable storage media 314. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 314 might include, for example, a hard disk, an integrated circuit assembly, magnetic tape, cartridge, optical disk, a CD or DVD, or other fixed or removable medium that is read by, written to or accessed by media drive 312. As these examples illustrate, the storage media 314 can include a computer usable storage medium having stored therein computer software or data.

In alternative embodiments, information storage mechanism 310 might include other similar instrumentalities for allowing computer programs or other instructions or data to be loaded into computing component 300. Such instrumentalities might include, for example, a fixed or removable storage unit 322 and an interface 320. Examples of such storage units 322 and interfaces 320 can include a program cartridge and cartridge interface, a removable memory (for example, a flash memory or other removable memory component) and memory slot, a PCMCIA slot and card, and other fixed or removable storage units 322 and interfaces 320 that allow software and data to be transferred from the storage unit 322 to computing component 300.

Computing component 300 might also include a communications interface 324. Communications interface 324 might be used to allow software and data to be transferred between computing component 300 and external devices. Examples of communications interface 324 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 324 might typically be carried on signals, which can be electronic, electromagnetic (which includes optical) or other signals capable of being exchanged by a given communications interface 324. These signals might be provided to communications interface 324 via a channel 328. This channel 328 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 308, storage unit 320, media 314, and channel 328. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 300 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
   detecting an original chain of devices including a first device connected to a second device connected to a third device, wherein the second device is identified using a second identifier of the second device, and the third device is identified using a third identifier of the third device, and wherein the original chain of devices is configured to distribute content from the first device through the second device to the third device;
   generating a first watermark payload based upon the original chain of devices;
   embedding the first watermark payload in a first portion of the content;
   distributing the first portion of the content embedded with the first watermark payload via the original chain of devices from the first device through the second device to the third device;
   while distributing the first portion of the content embedded with the first watermark payload via the original chain of devices, detecting a change in the original chain of devices resulting in a changed chain of devices, based on identifying a fourth identifier of a fourth device, the change being an inclusion of the fourth device between the first device and the third device in the original chain of devices resulting in the changed chain of devices;
   generating a second watermark payload different than the first waterpark payload, in response to detecting the change;
   embedding the second watermark payload in a second portion of the content following the first portion of the content; and
   distributing the second portion of the content embedded with the second watermark payload via the changed chain of devices from the first device through the fourth device to the third device.

2. The method of claim 1, wherein the change includes replacement of the second device by the fourth device.

3. The method of claim 1, wherein the change includes the inclusion of the fourth device between the first device and the second device.

4. The method of claim 1, wherein the change includes the inclusion of the fourth device between the second device and the third device.

5. The method of claim 1, wherein the first watermark payload adds first information to the first portion of the content that indicates the first portion of the content embedded with the first watermark payload is legitimately reproduced, and wherein the second watermark payload adds second information to the second portion of the content that indicates the second portion of the content embedded with the second watermark payload is legitimately reproduced.

6. The method of claim 1, wherein the first device is a source device in the original chain of devices and the changed chain of devices.

7. The method of claim 1, wherein the third device plays back the second portion of the content embedded with the second watermark payload distributed to the third device, on a display connected to the third device.

8. The method of claim 1, wherein the method is performed by the first device, and wherein the second watermark payload reflects a temporal aspect of the change.

9. The method of claim 1, wherein the content comprises a digital video file, and embedding the second watermark payload in the second portion of the content embeds the second watermark payload in at least one frame of the digital video file.

10. The method of claim 1, further comprising:
    extracting the second watermark payload from the second portion of the content embedded with the second watermark payload; and
    discerning the change based on the extracted second watermark payload.

11. A first device comprising:
    a memory including a computer code; and
    a processor configured to execute the computer code to:
    detect an original chain of devices including a first device connected to a second device connected to a third device, wherein the second device is identified using a second identifier of the second device, and the third device is identified using a third identifier of the third device, and wherein the original chain of devices is configured to distribute content from the first device through the second device to the third device;
    generate a first watermark payload based upon the original chain of devices;
    embed the first watermark payload in a first portion of the content;
    distribute the first portion of the content embedded with the first watermark payload via the original chain of devices from the first device through the second device to the third device;
    while distributing the first portion of the content embedded with the first watermark payload via the original chain of devices, detect a change in the original chain of devices resulting in a changed chain of devices, based on identifying a fourth identifier of a fourth device, the change being an inclusion of the fourth device between the first device and the third device in the original chain of devices resulting in the changed chain of devices;
    generate a second watermark payload different than the first waterpark payload, in response to detecting the change;
    embed the second watermark payload in a second portion of the content following the first portion of the content; and
    distribute the second portion of the content embedded with the second watermark payload via the changed chain of devices from the first device through the fourth device to the third device.

12. The first device of claim 11, wherein the change includes replacement of the second device by the fourth device.

13. The first device of claim 11, wherein the change includes the inclusion of the fourth device between the first device and the second device.

14. The first device of claim 11, wherein the change includes the inclusion of the fourth device between the second device and the third device.

15. The first device of claim 11, wherein the first device is a source device in the original chain of devices and the changed chain of devices.

16. The first device of claim 11, wherein the third device plays back the second portion of the content embedded with the second watermark payload distributed to the third device, on a display connected to the third device.

17. The first device of claim 11, wherein the content comprises a digital video file, and embedding the second watermark payload in the second portion of the content embeds the second watermark payload in at least one frame of the digital video file.

18. The first device of claim 11, wherein the first watermark payload adds first information to the first portion of the content that indicates the first portion of the content embedded with the first watermark payload is legitimately reproduced, and wherein the second watermark payload adds second information to the second portion of the content that indicates the second portion of the content embedded with the second watermark payload is legitimately reproduced.

19. The first device of claim 11, wherein the second watermark payload reflects a temporal aspect of the change.

20. A method comprising:
generating a first watermark payload based upon an original chain of devices;
embedding the first watermark payload in a first portion of the content, wherein the first watermark payload adds information to the first portion of the content that indicates the first portion of the content embedded with the first watermark payload is legitimately reproduced;
distributing the first portion of the content embedded with the first watermark via the original chain of devices;
while distributing the first portion of the content embedded with the first watermark via the original chain of devices, detecting a change in the original chain of devices resulting in a changed chain of devices, the change being at least one of adding a new device to the original chain of devices or removing an existing device from the original chain of devices;
generating a second watermark payload different than the first waterpark payload, in response to detecting the change;
embedding the second watermark payload in a second portion of the content following the first portion of the content, wherein the second watermark payload adds information to the second portion of the content that indicates the second portion of the content embedded with the second watermark payload is legitimately reproduced; and
distributing the second portion of the content embedded with the second watermark via the changed chain of devices.

\* \* \* \* \*

UNITED STATES PATENT AND TRADEMARK OFFICE
CERTIFICATE OF CORRECTION

PATENT NO. : 11,172,093 B2
APPLICATION NO. : 14/960702
DATED : November 9, 2021
INVENTOR(S) : Arana et al.

Page 1 of 1

It is certified that error appears in the above-identified patent and that said Letters Patent is hereby corrected as shown below:

In the Claims

Column 12, Line 28, please change "including a first" to --including the first--.

Column 14, Line 5, please change "the content" to --content--.

Column 11, Line 45, please change "waterpark" to --watermark--.

Column 12, Line 56, please change "waterpark" to --watermark--.

Column 14, Line 18, please change "waterpark" to --watermark--.

Signed and Sealed this
Nineteenth Day of April, 2022

Katherine Kelly Vidal
*Director of the United States Patent and Trademark Office*